(12) United States Patent
Lee et al.

(10) Patent No.: US 9,413,213 B2
(45) Date of Patent: Aug. 9, 2016

(54) SWITCHED RELUCTANCE MOTOR AND STATOR THEREOF

(71) Applicants: KOREA ELECTRONICS TECHNOLOGY INSTITUTE, Seongnam-si, Gyeonggi-do (KR); University of Ulsan Foundation For Industry Cooperation, Ulsan (KR)

(72) Inventors: Cheewoo Lee, Busan (KR); Jin Hur, Seongnam-si (KR); Jeongjong Lee, Incheon (KR); Sehyun Rhyu, Bucheon-si (KR); Jungmoo Seo, Goyang-si (KR); Youngkyoun Kim, Seoul (KR); Insoung Jung, Seoul (KR)

(73) Assignees: KOREA ELECTRONICS TECHNOLOGY INSTITUTE, Seongnam-Si, Gyeonggi-Do (KR); UNIVERSITY OF ULSAN FOUNDATION FOR INDUSTRY COOPERATION, Ulsan (KR)

( * ) Notice: Subject to any disclaimer, the term of this patent is extended or adjusted under 35 U.S.C. 154(b) by 519 days.

(21) Appl. No.: 14/034,083

(22) Filed: Sep. 23, 2013

(65) Prior Publication Data

US 2015/0035389 A1 Feb. 5, 2015

(30) Foreign Application Priority Data

Jul. 31, 2013 (KR) .................. 10-2013-0090769

(51) Int. Cl.
*H02K 37/00* (2006.01)
*H02K 19/10* (2006.01)
*H02K 21/44* (2006.01)

(52) U.S. Cl.
CPC .............. *H02K 19/103* (2013.01); *H02K 21/44* (2013.01)

(58) Field of Classification Search
CPC ...... H02K 21/04; H02K 21/44; H02K 19/103
USPC .................... 310/46, 166, 168, 181
See application file for complete search history.

(56) References Cited

U.S. PATENT DOCUMENTS

| 3,984,711 | A | * | 10/1976 | Kordik | .................. | H02K 37/20 310/154.07 |
| 6,133,664 | A | * | 10/2000 | Torok | ..................... | H02K 29/03 310/181 |
| 2010/0072832 | A1 | * | 3/2010 | Zhu | ........................ | H02K 21/44 310/49.46 |
| 2011/0260672 | A1 | * | 10/2011 | Ramu | .................... | H02K 21/44 318/701 |

FOREIGN PATENT DOCUMENTS

| JP | 2004236369 A | 8/2004 |
| JP | 2011177021 A | 9/2011 |
| KR | 1020130019113 | 2/2013 |
| KR | 101255960 B1 | 4/2013 |

OTHER PUBLICATIONS

Korean Office Action for application No. 10-2013-0090769 dated Aug. 18, 2014.

* cited by examiner

*Primary Examiner* — Thanh Lam
(74) *Attorney, Agent, or Firm* — Hauptman Ham, LLP

(57) ABSTRACT

A stator of a switched reluctance motor includes a stator core part, stator coiling parts, stator salient parts, and pairs of permanent magnets. The stator coiling parts protrude inwardly from the stator core part and have coils wound on an external side thereof. The stator salient parts protrude inwardly from the stator core part and are disposed between the stator coiling parts. Each pair of the permanent magnets is inserted into each of the stator coiling parts and magnetized in the same direction as a direction of a magnetic field generated by the excitation of the coils. This stator has an electromagnetic structure designed to prevent the reversal of a magnetic field generated by the excited coils. The output of the motor is enhanced by inserting the permanent magnets so as to be magnetized in the same direction as a direction of a magnetic field generated by the excited coils.

8 Claims, 11 Drawing Sheets

SWITCHED RELUCTANCE MOTOR AND STATOR THEREOF

CROSS REFERENCE TO RELATED APPLICATION

This application claims the priority of Korean Patent Application No. 10-2013-0090769, filed on Jul. 31, 2013 in the Korean Intellectual Property Office (KIPO), the disclosure of which is incorporated herein in their entirety by reference.

TECHNICAL FIELD

The present disclosure relates to a switched reluctance motor and, more particularly, to a switched reluctance motor having a stator capable of enhancing the output of the motor.

BACKGROUND

Recently the demand of motors has greatly increased in various fields such as the automobile industry, the aerospace industry, the armament industry, medical devices, and home appliances. Additionally, an upsurge in the price of rare-earth resources causes an increase in the per-unit cost of motors that have permanent magnets of rare-earth resources in a rotor.

As one of alternatives to obviate the above problem, a switched reluctance motor attracts attention in these days. A switched reluctance motor rotates a rotor by using a reluctance torque generated according to variations in magnetic reluctance.

Normally, in a conventional switched reluctance motor, each of a stator and a rotor has a salient structure. The stator has coils wound on salient parts thereof to generate a reluctance torque according to variations in magnetic reluctance, and the rotor has no magnetization mechanism such as a coil or a permanent magnet. The rotor is connected, at a central part thereof, to and rotated together with a rotational axis that transmits a driving force of the motor.

Such a conventional switched reluctance motor rotates the rotor, depending on only a reluctance torque generated from the coils wound on the stator salient parts. Therefore, the conventional switched reluctance motor may have a lower output than that of a motor in which a rotor includes any magnetization mechanism.

In order to solve this problem, a way of adding permanent magnets to the stator may be considered. However, due to a magnetic flux produced at the stator salient parts on which the coils are wound, a stator core part of the conventional switched reluctance motor may have a portion where the reversal of a magnetic flux occurs and the other portion without the reversal of a magnetic flux. Therefore, if permanent magnets are added to the stator to enhance the output of the switched reluctance motor, a magnetic flux generated from the permanent magnets may offset a magnetic flux generated from the coils in a portion where the reversal of a magnetic flux occurs. Unfortunately, this may invite a reduction in a magnetic flux of the coils.

SUMMARY

Accordingly, one aspect of the present disclosure may provide an electromagnetic structure of a stator designed to prevent the reversal of a magnetic field generated by excited coils of the stator.

Another aspect of the present disclosure may provide a stator of a switched reluctance motor for enhancing the output of the motor by inserting permanent magnets so as to be magnetized in the same direction as a direction of a magnetic field generated by the excitation of the coils.

Still another aspect of the present disclosure may provide a switched reluctance motor having such a stator.

An embodiment in this disclosure may provide a stator of a switched reluctance motor. The stator comprises a stator core part, a plurality of stator coiling parts, a plurality of stator salient parts, and pairs of permanent magnets. The stator coiling parts protrude inwardly from the stator core part and have coils wound on an external side thereof. The stator salient parts protrude inwardly from the stator core part and are disposed between the stator coiling parts. Each pair of the permanent magnets is inserted into each of the stator coiling parts and magnetized in the same direction as a direction of a magnetic field generated by the excitation of the coils.

The stator may further comprise another pairs of permanent magnets. Each pair may be inserted into each of the stator salient parts and magnetized in the same direction as the direction of the magnetic field generated by the excitation of the coils.

In the stator, each pair of the permanent magnets inserted into each of the stator coiling parts may be extended into the stator core part adjacent to the stator coiling parts and magnetized in the same direction as the direction of the magnetic field generated by the excitation of the coils.

In the stator, each pair of the permanent magnets may be inserted into the stator coiling part so as to be equally distant from a central line of the stator coiling part.

In the stator, each pair of the permanent magnets may be inserted into the stator coiling part so as to be aligned with a protruding direction of the stator coiling part.

Another embodiment in this disclosure may provide a switched reluctance motor that comprises a stator and a rotor. The stator includes a stator core part, a plurality of stator coiling parts protruding inwardly from the stator core part and having coils wound on an external side thereof, a plurality of stator salient parts protruding inwardly from the stator core part and disposed between the stator coiling parts, and pairs of permanent magnets, each pair being inserted into each of the stator coiling parts and magnetized in the same direction as a direction of a magnetic field generated by the excitation of the coils. The rotor is installed inside the stator and includes a rotor core part, and a plurality of rotor salient parts protruding outwardly from the rotor core part, each of the rotor salient parts facing one of the stator coiling parts and the stator salient parts.

In the switched reluctance motor, the stator may further include another pairs of permanent magnets, each pair being inserted into each of the stator salient parts and magnetized in the same direction as the direction of the magnetic field generated by the excitation of the coils.

In the switched reluctance motor, each pair of the permanent magnets inserted into each of the stator coiling parts may be extended into the stator core part adjacent to the stator coiling parts and magnetized in the same direction as the direction of the magnetic field generated by the excitation of the coils.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a stator salient part" includes reference to one or more of such stator salient parts.

A switched reluctance motor rotates a rotor by using a reluctance torque generated according to variations in magnetic reluctance. In other words, when electric energy is supplied to a coil wound on a stator, reluctance torque is generated due to magnetic energy, i.e., variations in magnetic reluctance, and a rotor is rotated using such reluctance torque. Since the rotor does not require a permanent magnet formed of expensive rare-earth resources, the switched reluctance motor disclosed herein may be cost-effective.

However, no permanent magnet in the rotor may cause a smaller output of the switched reluctance motor in comparison with a normal motor having a permanent magnet in the rotor. The switched reluctance motor and its stator disclosed herein are designed to improve the output of the motor.

Figure 1:
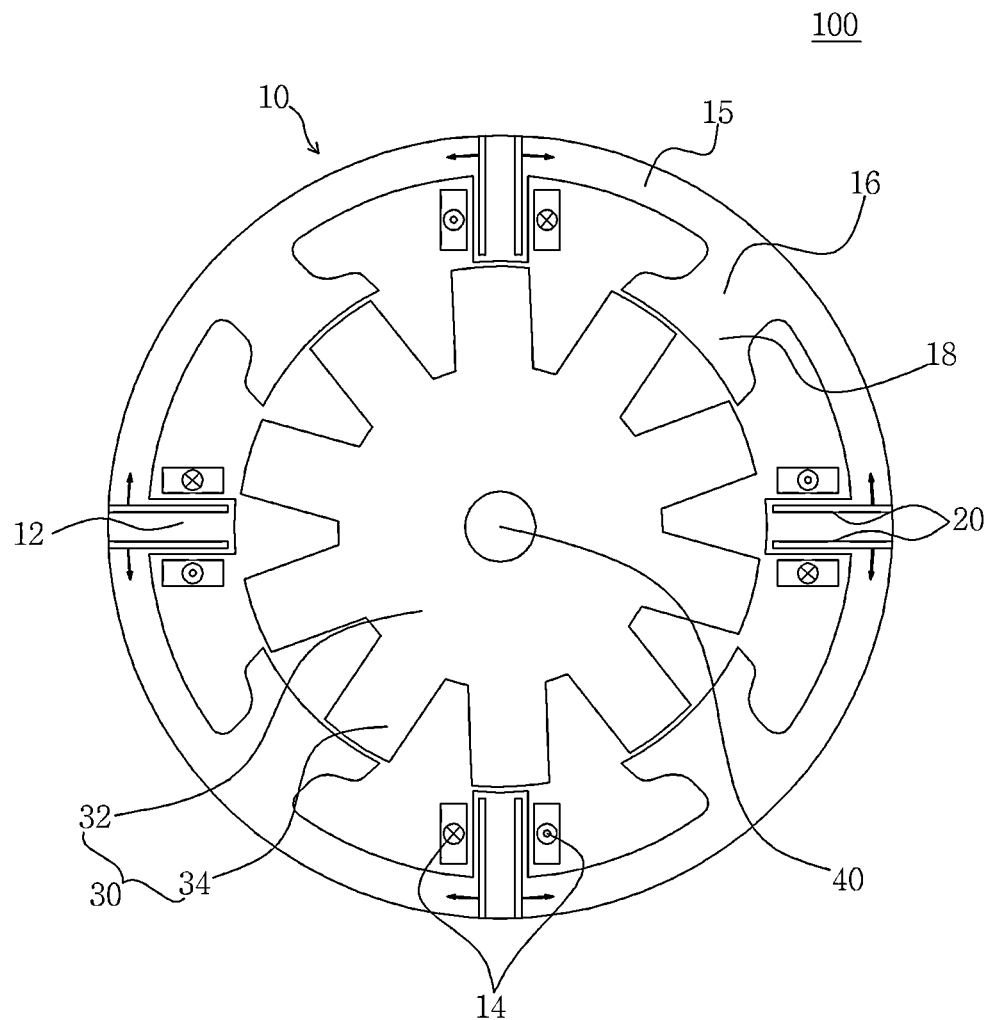
FIG. 1 is a schematic diagram illustrating a switched reluctance motor in accordance with the first embodiment of the present disclosure.

FIG. 1 is a schematic diagram illustrating a switched reluctance motor in accordance with the first embodiment of the present disclosure.

Referring to FIG. 1, in the first embodiment, the switched reluctance motor 100 includes a stator 10 and a rotor 30.

Although the switched reluctance motor 100 in the first embodiment is a two-phase type, this is exemplary only and not to be considered as a limitation of the present disclosure. Alternatively, any multi-phase type of the switched reluctance motor may be used.

The stator 10 includes a stator core part 15, a plurality of stator coiling parts 12, a plurality of stator salient parts 16, and a plurality of permanent magnets 20.

The stator 10 may be formed of a plurality of stacked core sheets.

The stator core part 15 has a tubular form from which the stator coiling parts 12 and the stator salient parts 16 protrude inwardly. The stator core part 15 may have various shapes depending on design types of the switched reluctance motor 100 in the first embodiment. Namely, the stator core part 15 may have a quadrangular form when the switched reluctance motor 100 is designed like a quadrangle, and may have a pentagonal form when the switched reluctance motor 100 is designed like a pentagon.

The stator coiling parts 12 protrude inwardly from the stator core part 15. Further, the stator coiling parts 12 are circularly disposed at regular intervals around a rotational axis 40.

Although the first embodiment uses four stator coiling parts 12 that protrude inwardly from the stator core part 15 and are circularly disposed at regular intervals around the rotational axis 40, this is exemplary only and not to be considered as a limitation of the present disclosure. Alternatively, any number of the stator coiling parts 12 may be used depending on design types of the switched reluctance motor 100. For example, if the switched reluctance motor 100 is designed as a three-phase type, six stator coiling parts may be used.

A coil 14 is wound on the external side of each stator coiling part 12. When electric energy is supplied to the coil 14, a magnetic field is generated and thereby a reluctance torque for causing the rotor 30 to rotate is formed. This will be described below. Meanwhile, a magnetic field generated from the coil 14 has a certain direction depending on a wound direction of the coil 14 according to Ampere's law. This will also be described below.

The stator salient parts 16 protrude inwardly from the stator core part 15, each intervening between the adjacent stator coiling parts 12. Namely, when the stator coiling parts 12 are circularly disposed at regular intervals around the rotational axis 40 inside the stator core part 15, the stator salient parts 16 are also circularly disposed at regular intervals between the stator coiling parts 12 around the rotational axis 40.

Although the first embodiment uses four stator coiling parts 12 and four stator salient parts 16 which are disposed by turns at regular intervals around the rotational axis 40, this is exemplary only and not to be considered as a limitation of the present disclosure. Alternatively, if six stator coiling parts are disposed at regular intervals around the rotational axis, six stator salient parts may also be disposed at regular intervals around the rotational axis such that each stator salient part intervenes between the adjacent stator coiling parts.

Each of the stator salient parts 16 has, at the inner end thereof, a stator tooth 18 extended in a radial direction, i.e., toward the rotational axis 40. The reason that the stator tooth 18 is formed is that the stator 10 and the rotor 30 should face and conform to each other to form a magnetic field. Namely, a magnetic field caused by the excited coil 14 can be formed along the stator coiling parts 12, the stator salient parts 16 and the rotor 30 only when the stator tooth 18 and the inner end of the stator coiling part 12 face and conform to a rotor salient part 34 of the rotor 30.

As discussed above, the stator 10 has the stator salient parts 16 disposed at regular intervals between the stator coiling parts 12 inside the stator core part 15. The structure of the stator 10 may prevent the reversal of a magnetic field generated by the excitation of the coil 14 wound on the stator coiling part 12. Namely, the stator 10 of the switched reluctance motor 100 in the first embodiment may not cause the reversal of a magnetic field in an excitation switching of phases.

Now, the reason that the reversal of a magnetic field is not caused will be described with reference to FIGS. 2 and.

Figure 2:
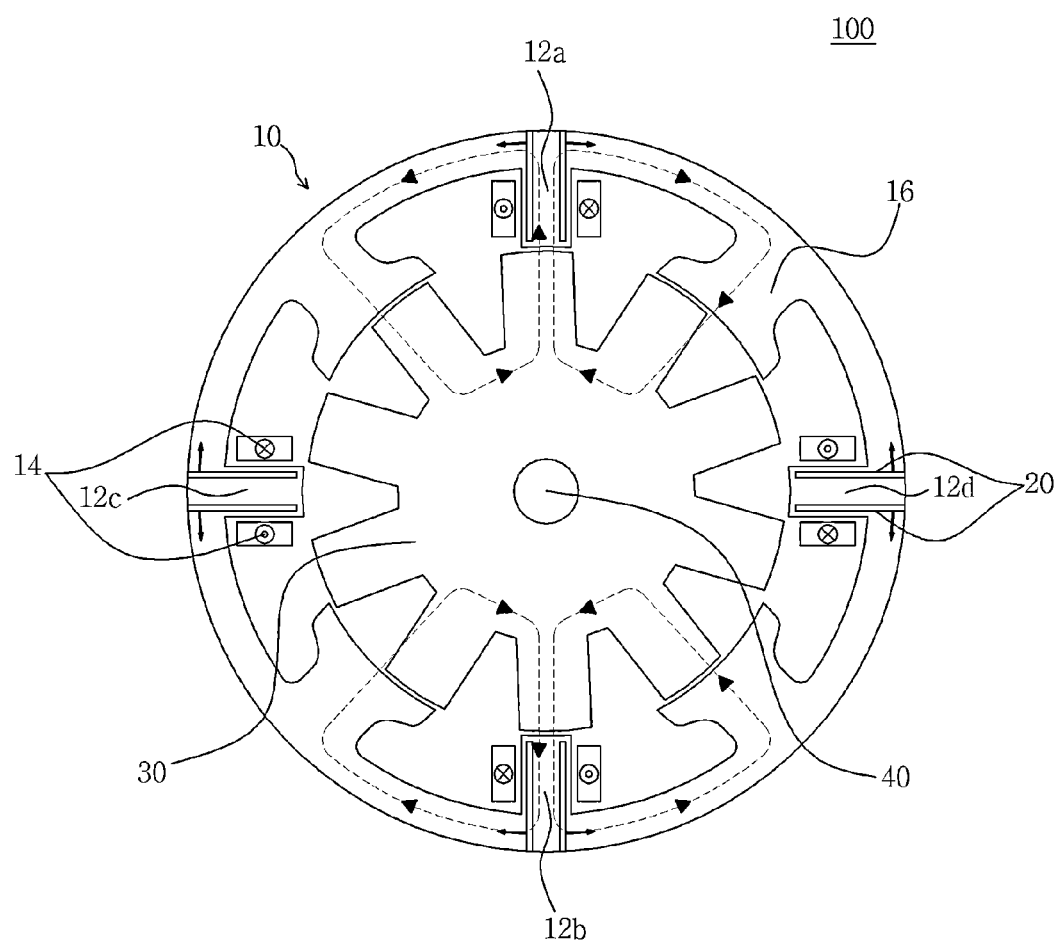
FIGS. 2 and 3 show a magnetic field direction of an excited coil and a magnetization direction of a permanent magnet in the switched reluctance motor in accordance with the first embodiment of the present disclosure.
Figure 3:
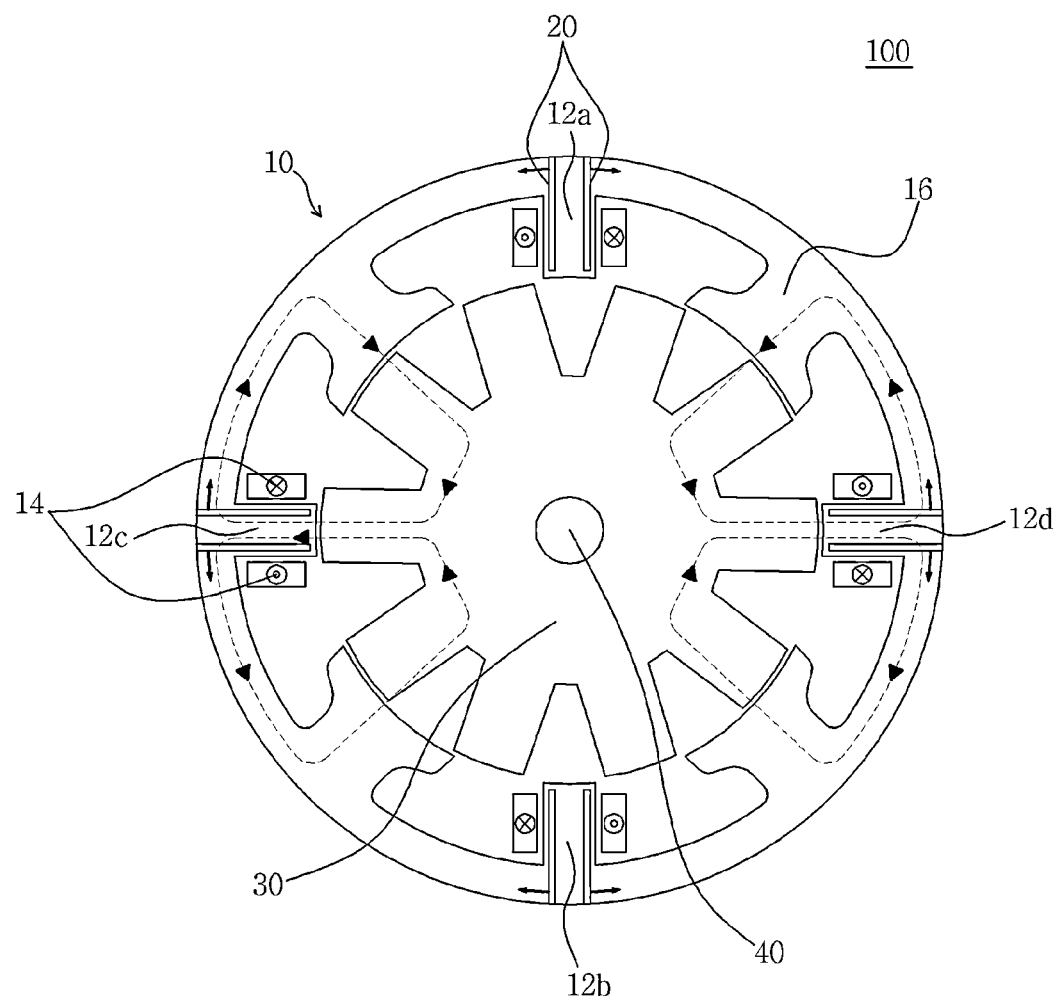

FIGS. 2 and 3 show a magnetic field direction of an excited coil and a magnetization direction of a permanent magnet in the switched reluctance motor in accordance with the first embodiment of the present disclosure.

Referring first to FIG. 2, when the coils 14 wound on the first stator coiling parts 12a and 12b are excited by electric energy, a magnetic field is generated as indicated by dotted lines. Specifically, when the coils 14 are excited, a magnetic field is generated in a direction from the first stator coiling parts 12a and 12b on which the coils 14 are wound, via the stator core part 15 adjacent to the first core coiling parts 12a and 12b, via the stator salient parts 16, and to the rotor 30 facing the stator salient parts 16. Further, the coils 14 are wound clockwise on the first stator coiling parts 12a and 12b when viewed from the rotational axis 40, so that a magnetic field is generated in a direction from the first stator coiling parts 12a and 12b to the stator core part 15 according to Ampere's law.

This magnetic field causes a reluctance torque, and thereby the rotor 30 is rotated.

Referring to FIG. 3, when the coils 14 wound on the second stator coiling parts 12c and 12d are excited by electric energy, a magnetic field is generated as indicated by dotted lines. Specifically, when the coils 14 are excited, a magnetic field is generated in a direction from the second stator coiling parts 12c and 12d on which the coils 14 are wound, via the stator core part 15 adjacent to the second core coiling parts 12c and 12d, via the stator salient parts 16, and to the rotor 30 facing the stator salient parts 16. Further, the coils 14 are wound clockwise on the second stator coiling parts 12c and 12d when viewed from the rotational axis 40, so that a magnetic field is generated in a direction from the second stator coiling parts 12c and 12d to the stator core part 15 according to Ampere's law.

This magnetic field causes a reluctance torque, and thereby the rotor 30 is rotated.

In particular, by the stator salient parts 16 respectively intervening between the adjacent stator coiling parts 12, a magnetic field generated by electric energy applied to the coils 14 wound on the first stator coiling parts 12a and 12b and a magnetic field generated by electric energy applied to the coils 14 wound on the second stator coiling parts 12c and 12d have no overlap between their paths. Thus, this prevents the reversal of a magnetic field. Additionally, the permanent magnets 20 are inserted into the stator 10 free from the reversal of a magnetic field such that it may coincide with the direction of a magnetic field. This will be described below.

Each of the stator coiling parts 12 accommodates a pair of the permanent magnets 20. Particularly, each of the permanent magnets 20 is inserted into the stator coiling part 12 such that it may be magnetized in the same direction as the direction of a magnetic field generated by the excitation of the coil 14. Namely, in case a magnetic field is formed toward the stator core part 15 by the coil 14 wound clockwise on the external side of the stator coiling part 12, a pair of the permanent magnets 20 magnetized from a south magnetic pole to a north magnetic pole is installed in the same direction as the direction of a magnetic field generated by the excitation of the coil 14. Namely, a pair of the permanent magnets 20 inserted into the stator coiling part 12 is installed so as to be magnetized in a direction from one portion of the stator core part 15 adjacent to the stator coiling part 12 to other portion of the stator core part 15 adjacent to the stator salient part 16.

Additionally, the permanent magnets 20 may be inserted in an extended form into the stator coiling part 12. Namely, a pair of the permanent magnets 20 may be inserted into the stator coiling part 12 and extended to the stator core part 15 adjacent to the stator coiling part 12 so as to be magnetized in the same direction as the direction of a magnetic field generated by the excitation of the coil 14.

Further, a pair of the permanent magnets 20 may be installed in the stator coiling part 12 so as to be equally distant from a central line of the stator coiling part 12. Therefore, when a pair of the permanent magnets 20 is magnetized in the same direction as a magnetic field direction which is formed bilaterally in the stator core part 15, the same amount of magnetization may be involved in the bilaterally formed magnetic field. The amount of magnetization may affect inductance, which will be described later.

Also, a pair of the permanent magnets 20 inserted into the stator coiling part 12 may be aligned with a protruding direction of the stator coiling part 12.

As discussed above, the permanent magnets 20 are inserted into the stator coiling part 12 so as to be magnetized in the same direction as the direction of a magnetic field generated by the excited coil 14. This may enhance the output of the switched reluctance motor 100 in accordance with the first embodiment, which will be described with reference to FIGS. 4 and 5.

Figure 4:
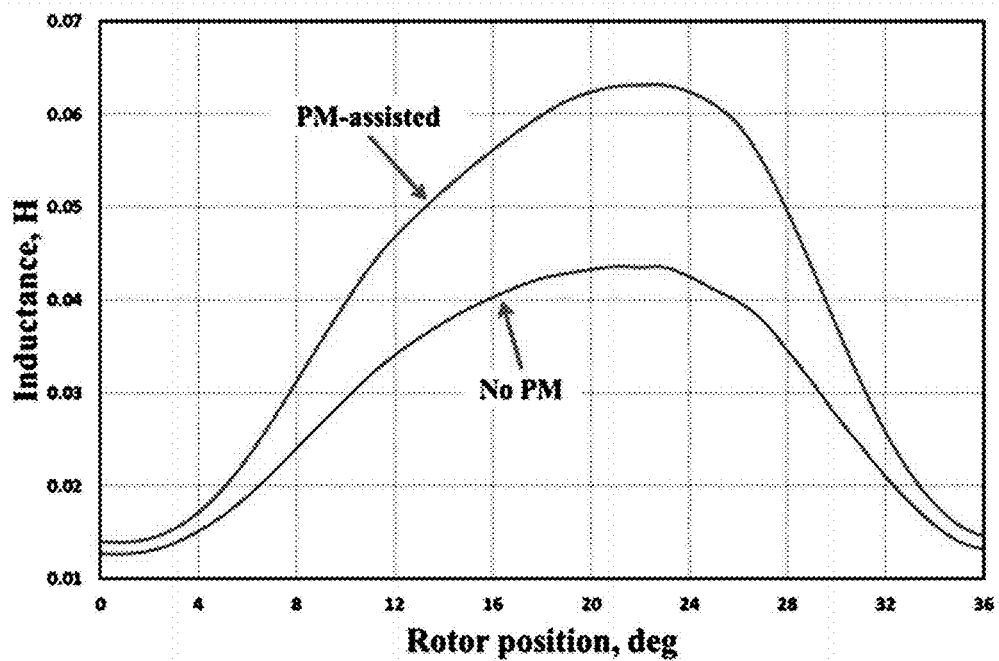
FIG. 4 is a graph showing variations in inductance when a permanent magnet is added or not to a stator of the switched reluctance motor in accordance with the first embodiment of the present disclosure.
Figure 5:
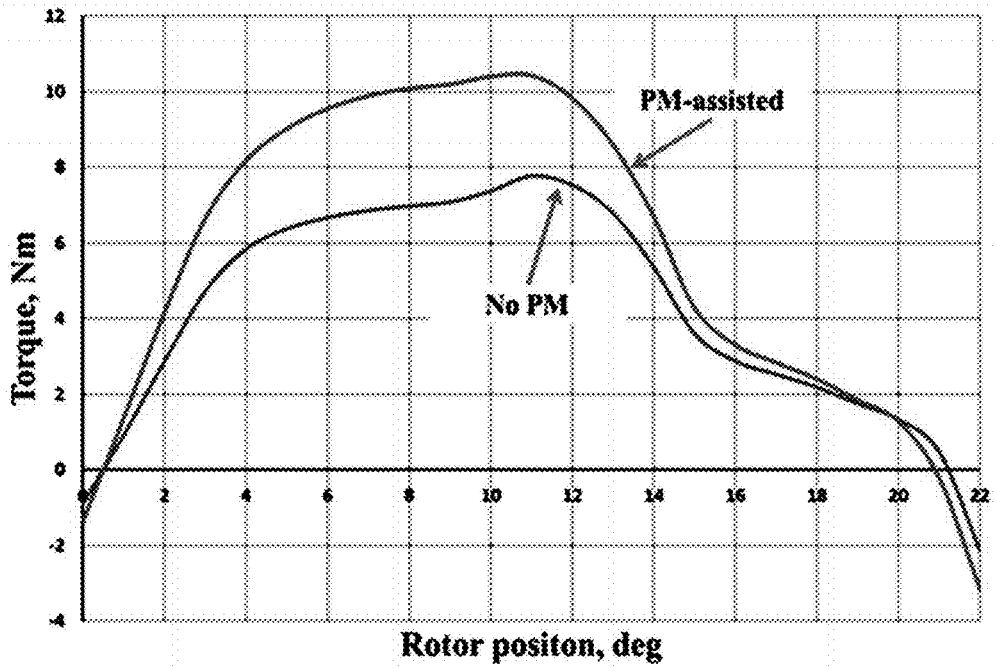
FIG. 5 is a graph showing variations in torque when a permanent magnet is added or not to a stator of the switched reluctance motor in accordance with the first embodiment of the present disclosure.

FIG. 4 is a graph showing variations in inductance when a permanent magnet is added or not to a stator of the switched reluctance motor in accordance with the first embodiment of the present disclosure, and FIG. 5 is a graph showing variations in torque when a permanent magnet is added or not to a stator of the switched reluctance motor in accordance with the first embodiment of the present disclosure.

Referring to FIGS. 4 and 5, the switched reluctance motor 100 produces a greater output according as a torque value increases. The torque value of the switched reluctance motor 100 may be calculated as follows.

$$T(\theta, i) = \frac{1}{2} i^2 \frac{dL(\theta)}{d\theta} \qquad \text{[Equation 1]}$$

In Equation 1, T stands for torque (Nm), $L(\theta)$ stands for inductance (H), i stands for a phase current (A), and $\theta$ stands for a rotor position (deg).

The torque value of the switched reluctance motor 100 is proportional to both the square of a phase current and the derivative of inductance with regard to a rotor position. In other words, inductance affects the torque value of the switched reluctance motor 100.

The inductance of a conventional switched reluctance motor free from permanent magnets in a stator may be calculated as follows.

$$L(\theta) = \frac{\lambda}{I} = \frac{N}{I} \emptyset_{coil} \quad \text{[Equation 2]}$$

In Equation 2, λ stands for a flux linkage (Wb), $\emptyset_{coil}$ stands for a flux of excited coil (Wb), N stands for the number of turns per pole (turns), and I stands for a phase current (A).

The inductance of the switched reluctance motor 100 in accordance with the first embodiment may be calculated as follows.

$$L(\theta) = \frac{\lambda}{I} = \frac{N}{I}(\emptyset_{coil} + \emptyset_{pm}) \quad \text{[Equation 3]}$$

In Equation 3, λ stands for a flux linkage (Wb), $\emptyset_{coil}$ stands for a flux of excited coil (Wb), N stands for the number of turns per pole (turns), I stands for a phase current (A), and $\emptyset_{pm}$ stands for a flux of permanent magnets (Wb).

As shown in the above Equations, the inductance of a conventional switched reluctance motor is proportional to a flux of excited coil, whereas the inductance of the switched reluctance motor 100 in the first embodiment is proportional to a flux of the permanent magnets 20 as well as a flux of the excited coil 14. Namely, since a flux of the permanent magnets 20 is added to a flux of the excited coil 14, the switched reluctance motor 100 in the first embodiment has greater inductance than that of a conventional switched reluctance motor.

As shown in FIG. 4, the inductance of the switched reluctance motor 100 in the first embodiment increases more than that of a conventional switched reluctance motor according as the rotor 30 approaches a position adjacent to the stator 10. Since an increase of inductance causes much greater torque, the switched reluctance motor 100 in the first embodiment produces a greater output than a conventional switched reluctance motor does, as shown in FIG. 5.

Namely, while a conventional switched reluctance motor having no permanent magnet in the stator uses only electric energy supplied to the coil in order to convert into magnetic energy and then output mechanical energy, the switched reluctance motor 100 having the permanent magnets 20 added to the stator 10 in the first embodiment uses magnetic energy of both the coil 14 and the permanent magnets 20 to produce mechanical energy. Therefore, with regard to the same input of electric energy, the switched reluctance motor 100 in the first embodiment may produce a greater output than a conventional switched reluctance motor.

Moreover, in the switched reluctance motor 100 of the first embodiment, the coils 14 are wound on the stator coiling part 12 after a pair of permanent magnets 20 is inserted into the stator coiling part 12. Therefore, the stiffness of the stator 10 may not be lowered in spite of the insertion of the permanent magnets 20, and there is not much possibility of any secondary trouble due to impact or damage of the permanent magnets 20 caused by the rotation of the rotor 30.

The permanent magnets 20 may use at least one of a neodymium magnet, a ferrite magnet, a rubber magnet, an alnico magnet, and a samarium-cobalt magnet. Namely, in addition to magnets formed of expensive rare-earth resources, any type of magnet capable of permanently preserving a magnetic force in a magnetized state may be further used for the permanent magnets 20 inserted into the stator 10. Also, the permanent magnets 20 may be selected according to types of equipment in which the switched reluctance motor 100 is used.

A neodymium magnet which is composed of neodymium, iron and boron has the strongest magnetic force among permanent magnets, has an excellent coercive force, and has the maximum energy product. A ferrite magnet which is formed of a mixture of iron and oxide of manganese, cobalt, nickel, etc. keeps a magnetic force even at a high temperature and has a low price. A rubber magnet formed of ferrite powder with rubber or plastic mixed has excellent elasticity, is flexible, and can be easily cut out without using any special tool. An alnico magnet largely composed of alnico can be used at a very high temperature more than 600° C. and has enough hardness to endure any external shock. A samarium-cobalt magnet made of an alloy of cobalt and any other rare-earth resource has high residual flux density and coercive force.

Meanwhile, the rotor 30 is installed inside the stator 10 and has a central hole for receiving the rotational axis 40 connected thereto. When the rotor 30 rotates, the rotational axis 40 rotates thereby and transmits mechanical energy.

The rotor 30 includes a rotor core part 32 and a plurality of rotor salient parts 34 which protrude outwardly from the rotor core part 32. Namely, the rotor 30 is installed to be rotated inside the stator 10 and has the rotor salient parts 34 circularly disposed at regular intervals around the rotational axis 40.

The rotor salient parts 34 are disposed to face by turns the stator tooth 18 and the stator coiling part 16, so that a magnetic field formed from the excited coil 14 causes a reluctance torque to rotate the rotor 30.

Figure 6:
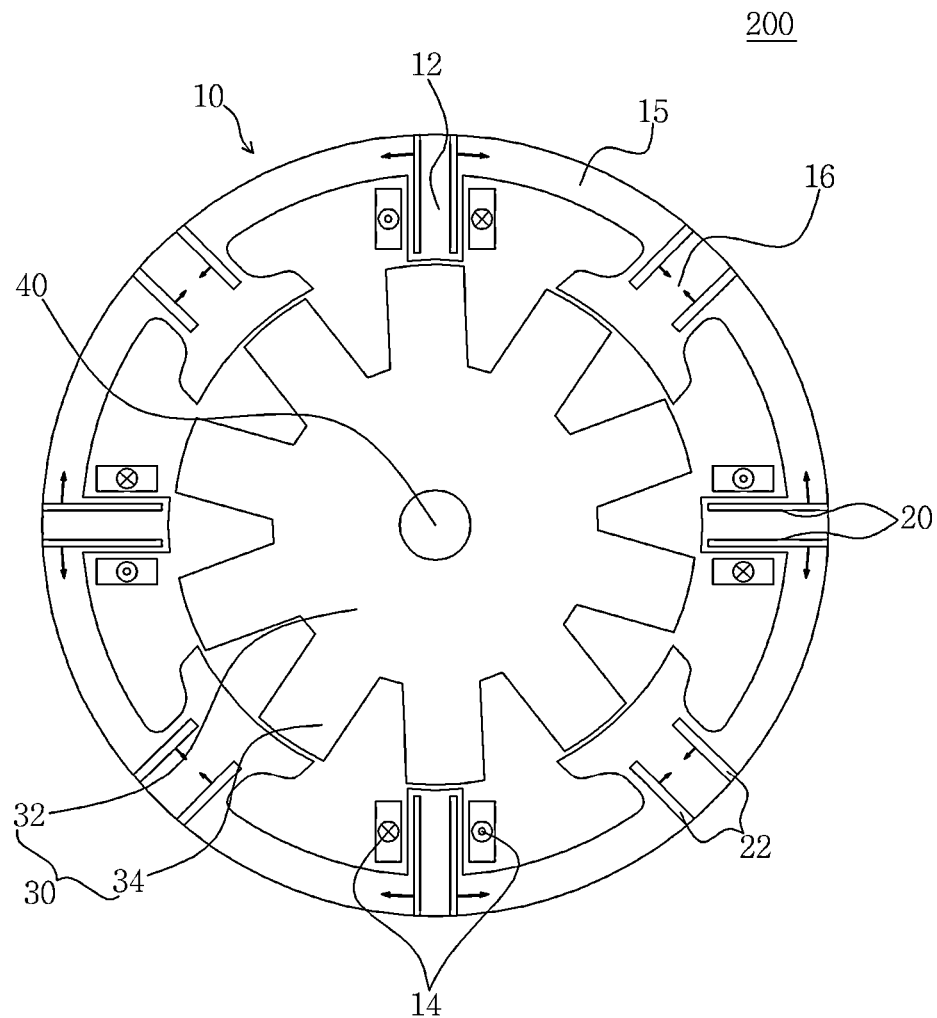
FIG. 6 is a schematic diagram illustrating a switched reluctance motor in accordance with the second embodiment of the present disclosure.
Figure 7:
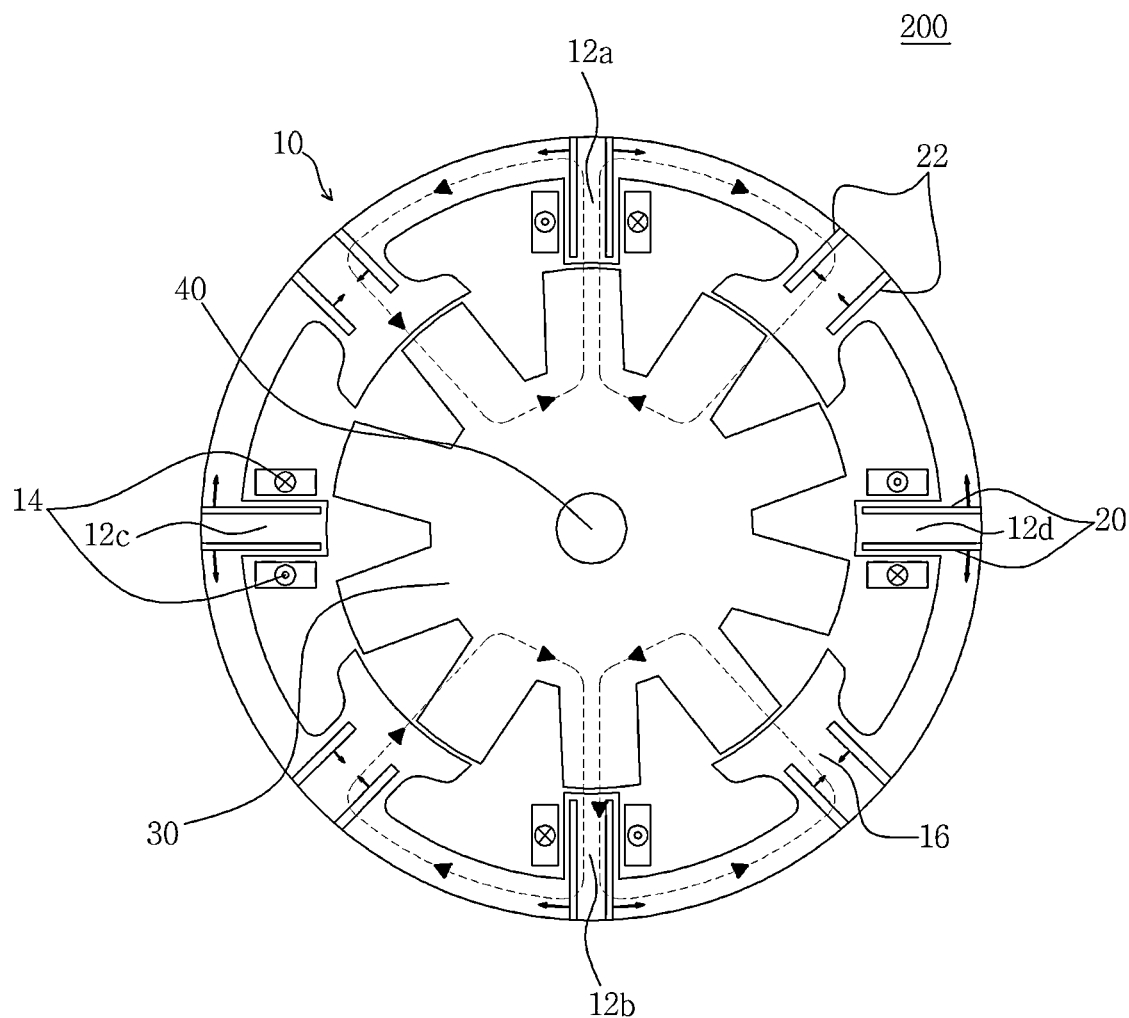
FIGS. 7 and 8 show a magnetic field direction of an excited coil and a magnetization direction of a permanent magnet in the switched reluctance motor in accordance with the second embodiment of the present disclosure.
Figure 8:
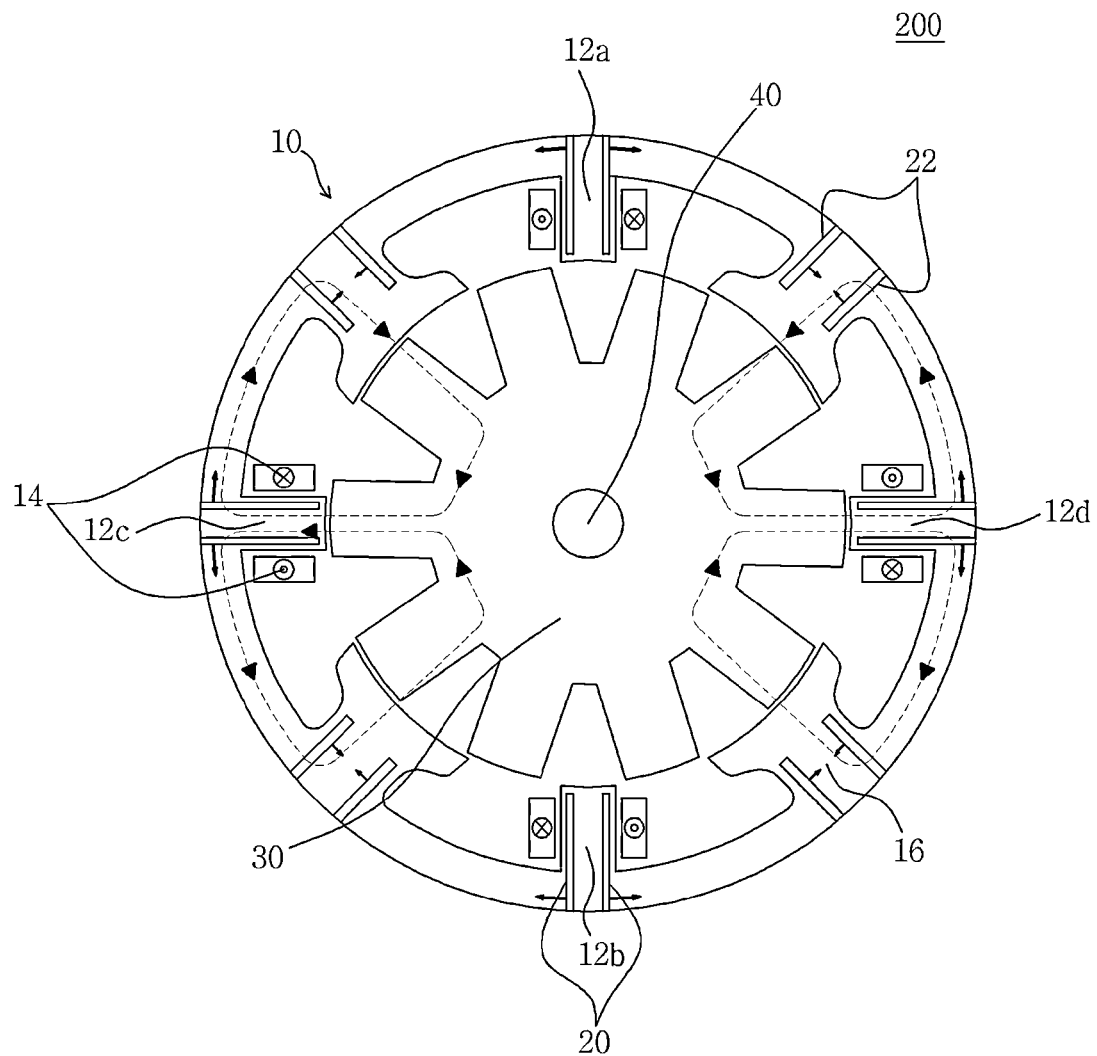

FIG. 6 is a schematic diagram illustrating a switched reluctance motor in accordance with the second embodiment of the present disclosure, and FIGS. 7 and 8 show a magnetic field direction of an excited coil and a magnetization direction of a permanent magnet in the switched reluctance motor in accordance with the second embodiment of the present disclosure.

Referring to FIGS. 6 to 8, in the second embodiment, the switched reluctance motor 200 includes the stator 10 and the rotor 30.

Although the switched reluctance motor 200 in the second embodiment is a two-phase type, this is exemplary only and not to be considered as a limitation of the present disclosure. Alternatively, any multi-phase type of the switched reluctance motor may be used.

The stator 10 includes the stator core part 15, the stator coiling parts 12, the stator salient parts 16, and the permanent magnets 20 and 22.

The stator core part 15, the stator coiling parts 12, the stator salient parts 16, and the rotor 30 are the same elements as those discussed above in the first embodiment. Therefore, the following description will be focused on the permanent magnets 20 and 22.

When the coils 14 wound on the first stator coiling parts 12*a* and 12*b* are excited by electric energy as shown in FIG. 7, a magnetic field is generated as indicated by dotted lines. Specifically, when the coils 14 are excited, a magnetic field is generated in a direction from the first stator coiling parts 12*a* and 12*b* on which the coils 14 are wound, via the stator core part 15 adjacent to the first core coiling parts 12*a* and 12*b*, via the stator salient parts 16, and to the rotor 30 facing the stator salient parts 16. Further, the coils 14 are wound clockwise on the first stator coiling parts 12*a* and 12*b* when viewed from the rotational axis 40, so that a magnetic field is generated in a direction from the first stator coiling parts 12a and 12b to the stator core part 15 according to Ampere's law.

This magnetic field causes a reluctance torque, and thereby the rotor 30 is rotated.

When the coils 14 wound on the second stator coiling parts 12c and 12d are excited by electric energy as shown in FIG. 8, a magnetic field is generated as indicated by dotted lines. Specifically, when the coils 14 are excited, a magnetic field is generated in a direction from the second stator coiling parts 12c and 12d on which the coils 14 are wound, via the stator core part 15 adjacent to the second core coiling parts 12c and 12d, via the stator salient parts 16, and to the rotor 30 facing the stator salient parts 16. Further, the coils 14 are wound clockwise on the second stator coiling parts 12c and 12d when viewed from the rotational axis 40, so that a magnetic field is generated in a direction from the second stator coiling parts 12c and 12d to the stator core part 15 according to Ampere's law.

This magnetic field causes a reluctance torque, and thereby the rotor 30 is rotated.

In particular, by the stator salient parts 16 respectively intervening between the adjacent stator coiling parts 12, a magnetic field generated by electric energy applied to the coils 14 wound on the first stator coiling parts 12a and 12b and a magnetic field generated by electric energy applied to the coils 14 wound on the second stator coiling parts 12c and 12d have no overlap between their paths. Thus, this prevents the reversal of a magnetic field.

Each pair of the permanent magnets 20 and 22 is inserted into the stator coiling parts 12 and the stator salient parts 16 so as to be magnetized in the same direction as the direction of a magnetic field generated by the excitation of the coil 14. Namely, in case a magnetic field is formed toward the stator core part 15 by the coil 14 wound clockwise on the external side of the stator coiling part 12, the permanent magnets 20 and 22 magnetized from a south magnetic pole to a north magnetic pole is installed in the same direction as the direction of a magnetic field generated by the excitation of the coil 14. Namely, a pair of the permanent magnets 20 inserted into the stator coiling part 12 is installed so as to be magnetized in a direction from one portion of the stator core part 15 adjacent to the stator coiling part 12 to other portion of the stator core part 15 adjacent to the stator salient part 16. In contrast, a pair of the permanent magnets 22 inserted into the stator salient part 16 is installed so as to be magnetized in a direction from the external side of the stator salient part 16 to the internal side of the stator salient part 16.

When the permanent magnets 20 and 22 inserted respectively into the stator coiling part 12 and stator salient part 16 are magnetized in the same direction as the direction of a magnetic field generated by the excited coil 14, a reluctance torque density may be enhanced. Namely, the switched reluctance motor 200 in the second embodiment not only has a structure of the stator 10 capable of preventing the reversal of a magnetic field, but also has two kinds of permanent magnets 20 and 22 inserted respectively into the stator coiling part 12 and stator salient part 16 so as to be magnetized in the same direction as the direction of a magnetic field generated by the excited coil 14. This increases inductance and a reluctance torque, thus resulting in a much greater output.

As discussed above, the torque value associated with the output of the switched reluctance motor 200 is proportional to both the square of a phase current and the derivative of inductance with regard to a rotor position. In other words, inductance is closely associated with the output of the switched reluctance motor 200.

As shown in the above-discussed Equations, the inductance of a conventional switched reluctance motor is proportional to a flux of excited coil, whereas the inductance of the switched reluctance motor 200 in the second embodiment is proportional to a flux of the permanent magnets 20 and 22 as well as a flux of the excited coil 14. Namely, since a flux of the permanent magnets 20 and 22 inserted into the stator coiling part 12 and stator salient part 16 is added to a flux of the excited coil 14, the switched reluctance motor 200 in the second embodiment has greater inductance than that of a conventional switched reluctance motor.

Namely, while a conventional switched reluctance motor having no permanent magnet in the stator uses only electric energy supplied to the coil in order to convert into magnetic energy and then output mechanical energy, the switched reluctance motor 200 having the permanent magnets 20 and 22 added to the stator 10 in the second embodiment uses magnetic energy of both the coil 14 and the permanent magnets 20 and 22 to produce mechanical energy. Therefore, with regard to the same input of electric energy, the switched reluctance motor 200 in the second embodiment may produce a greater output than a conventional switched reluctance motor.

Moreover, the switched reluctance motor 200 of the second embodiment includes the permanent magnets 22 inserted into the stator salient parts 16 as well as the permanent magnets 20 inserted into the stator coiling parts 12, all of which are magnetized in the same direction as the direction of a magnetic field generated by the excited coil 14. Therefore, compared to the switched reluctance motor 100 using only the permanent magnets 20 inserted into the stator coiling parts 12 in the first embodiment, the switched reluctance motor 200 of the second embodiment may produce a much higher output.

Additionally, the permanent magnets 20 may be inserted in an extended form into the stator coiling part 12. Namely, a pair of the permanent magnets 20 may be inserted into the stator coiling part 12 and extended to the stator core part 15 adjacent to the stator coiling part 12 so as to be magnetized in the same direction as the direction of a magnetic field generated by the excitation of the coil 14.

Similarly, the permanent magnets 22 may be inserted in an extended form into the stator salient part 16. Namely, a pair of the permanent magnets 22 may be inserted into the stator salient part 16 and extended to the stator core part 15 adjacent to the stator salient part 16 so as to be magnetized in the same direction as the direction of a magnetic field generated by the excitation of the coil 14.

Figure 9:
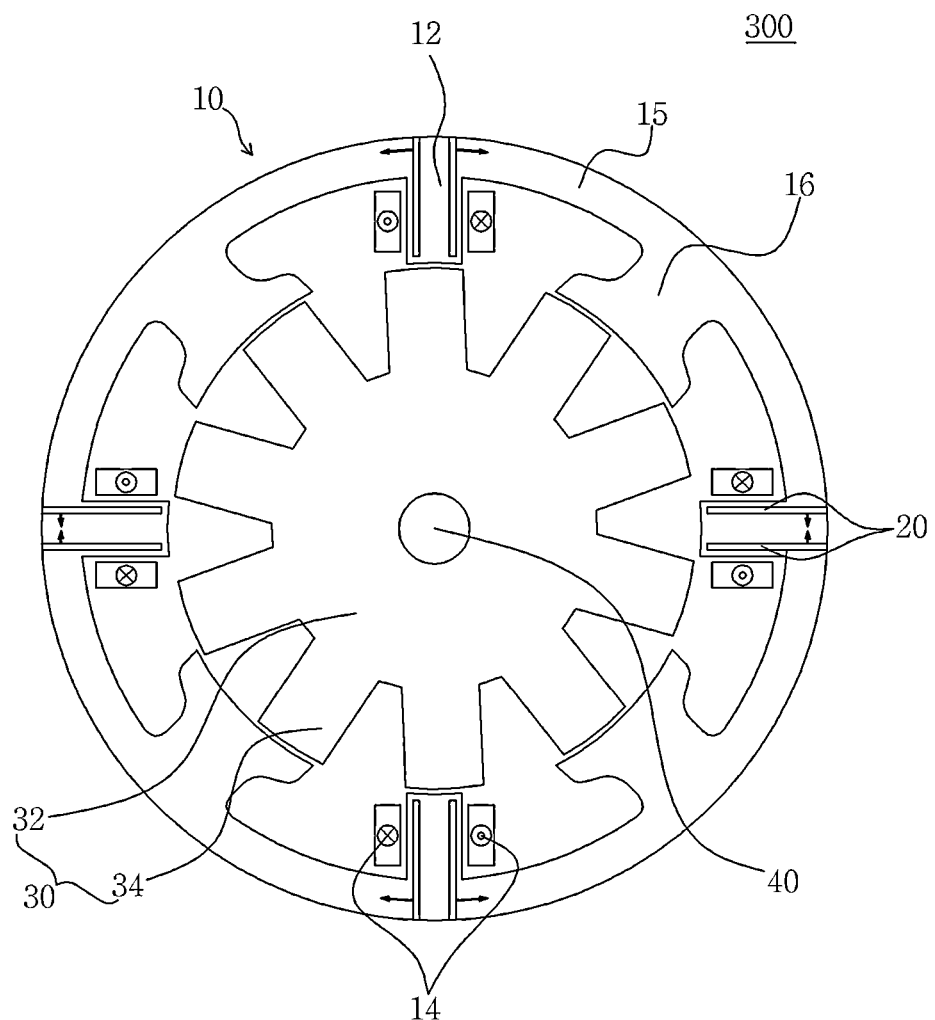
FIG. 9 is a schematic diagram illustrating a switched reluctance motor in accordance with the third embodiment of the present disclosure.

FIG. 9 is a schematic diagram illustrating a switched reluctance motor in accordance with the third embodiment of the present disclosure.

Referring to FIG. 9, in the third embodiment, the switched reluctance motor 300 includes the stator 10 and the rotor 30.

Excepting a wound direction of the coils 14, the switched reluctance motor 300 in the third embodiment is nearly similar to the switched reluctance motor 100 in the first embodiment. Therefore, the following description will be focused on the coils 14.

As discussed above, the coils 14 are wound on the stator coiling parts 12. Particularly, in the switched reluctance motor 300 of the third embodiment, one kind of the coils 14 is wound clockwise on the first stator coiling parts 12a and 12b, and the other kind of the coils 14 is wound counterclockwise on the second stator coiling parts 12c and 12d.

When the coils 14 wound clockwise on the first stator coiling parts 12a and 12b are excited, a magnetic field is generated in a direction from the first stator coiling parts 12a and 12b on which the coils 14 are wound, via the stator core part 15 adjacent to the first core coiling parts 12a and 12b, via the stator salient parts 16, and to the rotor 30 facing the stator salient parts 16.

A pair of the permanent magnets 20 inserted into the first stator coiling parts 12a and 12b is magnetized in the same direction as the direction of a magnetic field generated by the excitation of the coil 14. Namely, in case a magnetic field is formed toward the stator core part 15 by the coil 14 wound clockwise on the external side of the first stator coiling parts 12a and 12b, the permanent magnets 20 magnetized from a south magnetic pole to a north magnetic pole is installed in the same direction as the direction of a magnetic field generated by the excited coil 14. Namely, the permanent magnets 20 inserted into the first stator coiling parts 12a and 12b is installed so as to be magnetized in a direction from one portion of the stator core part 15 adjacent to the first stator coiling parts 12a and 12b to other portion of the stator core part 15 adjacent to the stator salient part 16.

In contrast, when the coils 14 wound counterclockwise on the second stator coiling parts 12c and 12d are excited, a magnetic field is generated in a direction from the second stator coiling parts 12c and 12d on which the coils 14 are wound, via the rotor 30 facing the second stator coiling parts 12c and 12d, via the stator salient parts 16, and to the stator core part 15 adjacent to the core salient parts 16.

A pair of the permanent magnets 20 inserted into the second stator coiling parts 12c and 12d is magnetized in the same direction as the direction of a magnetic field generated by the excitation of the coil 14. Namely, in case a magnetic field is formed toward the second coiling parts 12c and 12d by the coil 14 wound counterclockwise on the external side of the second stator coiling parts 12c and 12d, the permanent magnets 20 magnetized from a south magnetic pole to a north magnetic pole is installed in the same direction as the direction of a magnetic field generated by the excited coil 14. Namely, the permanent magnets 20 inserted into the second stator coiling parts 12c and 12d is installed so as to be magnetized in a direction from the external side of the second stator coiling parts 12c and 12d to the internal side of the second stator coiling parts 12c and 12d.

Figure 10:
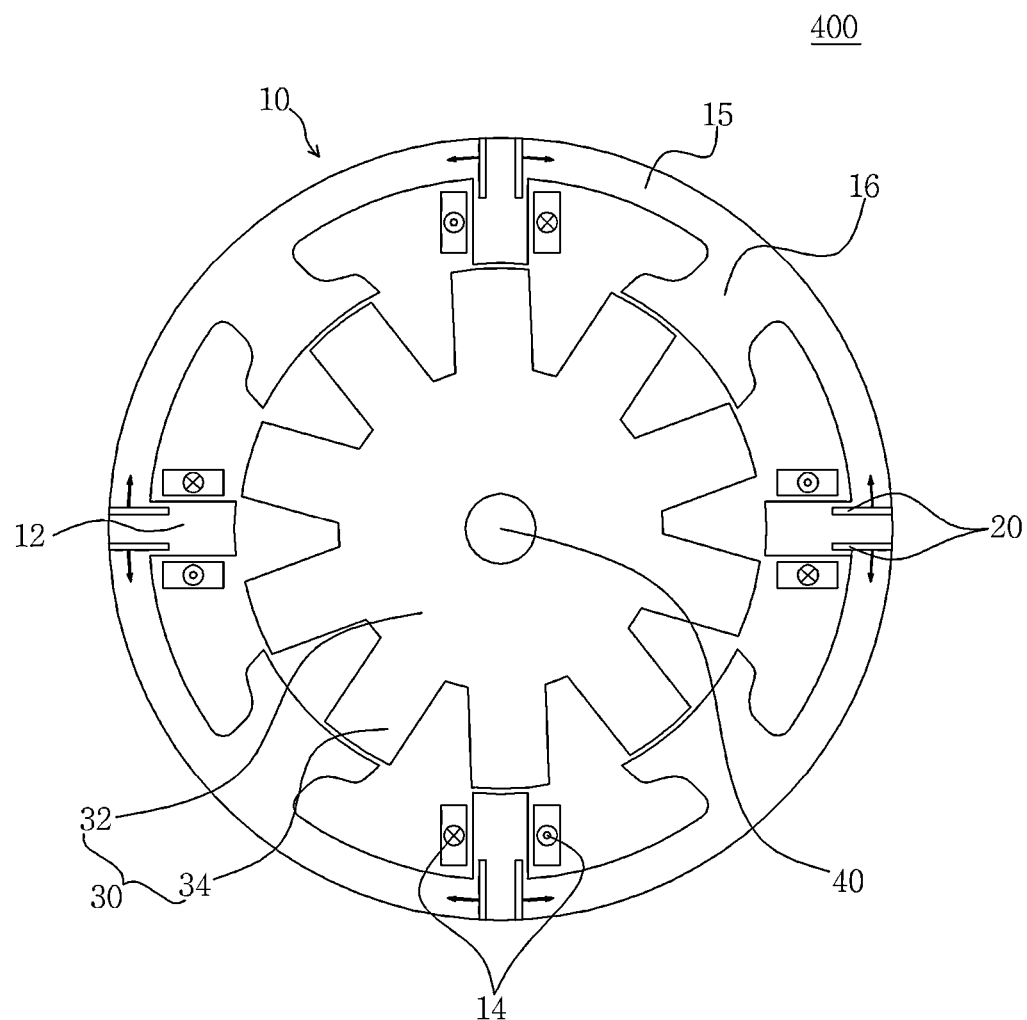
FIG. 10 is a schematic diagram illustrating a switched reluctance motor in accordance with the fourth embodiment of the present disclosure.

FIG. 10 is a schematic diagram illustrating a switched reluctance motor in accordance with the fourth embodiment of the present disclosure.

Referring to FIG. 10, in the fourth embodiment, the switched reluctance motor 400 includes the stator 10 and the rotor 30.

The stator 10 includes the stator core part 15, the stator coiling parts 12, the stator salient parts 16, and the permanent magnets 20.

The stator core part 15, the stator coiling parts 12, the stator salient parts 16, and the rotor 30 are the same elements as those discussed above in the first embodiment. Therefore, the following description will be focused on the permanent magnets 20.

A pair of the permanent magnets 20 may be inserted into the stator core part 15 adjacent to the stator coiling parts 12 so as to be magnetized in the same direction as the direction of a magnetic field generated by the excitation of the coil 14. Namely, in case a magnetic field is formed in a direction from the stator coiling part 12 to the stator core part 15 by the coil 14 wound clockwise on the external side of the stator coiling part 12, a pair of the permanent magnets 20 is installed so as to be magnetized in a direction from one portion of the stator core part 15 adjacent to the stator coiling part 12 to other portion of the stator core part 15 adjacent to the stator salient part 16.

Additionally, the permanent magnets 20 inserted into the stator core part 15 adjacent to the stator coiling part 12 may be partly extended into the stator coiling part 12 and magnetized in the same direction as the direction of a magnetic field generated by the excited coil 14.

Figure 11:
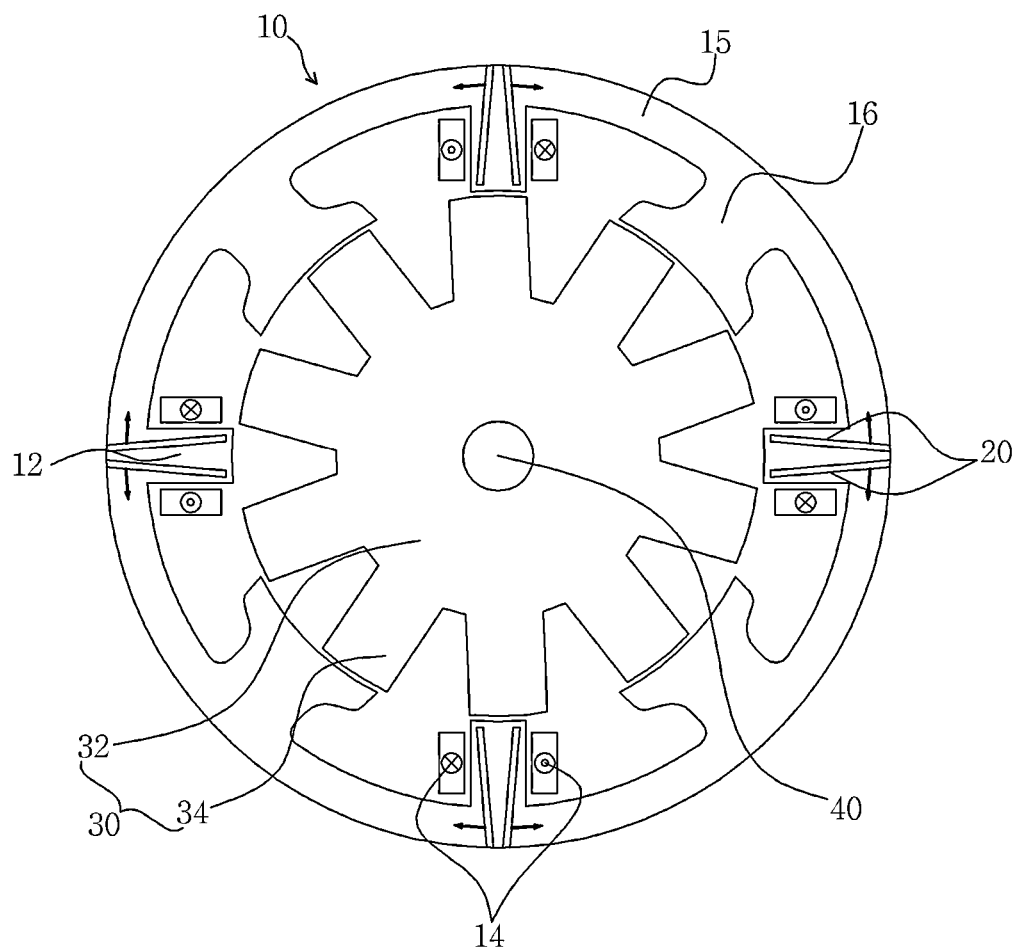
FIG. 11 is a schematic diagram illustrating a switched reluctance motor in accordance with the fifth embodiment of the present disclosure.

FIG. 11 is a schematic diagram illustrating a switched reluctance motor in accordance with the fifth embodiment of the present disclosure.

Referring to FIG. 11, in the fifth embodiment, the switched reluctance motor 500 includes the stator 10 and the rotor 30.

The stator 10 includes the stator core part 15, the stator coiling parts 12, the stator salient parts 16, and the permanent magnets 20.

The stator core part 15, the stator coiling parts 12, the stator salient parts 16, and the rotor 30 are the same elements as those discussed above in the first embodiment. Therefore, the following description will be focused on the permanent magnets 20.

A pair of the permanent magnets 20 may be inserted into the stator coiling parts 12 so as to be equally distant from a central line of the stator coiling part 12 and also to arrange in a diagonal line. Namely, the permanent magnets 20 may be inserted in the stator coiling parts 12 such that a gap between inner ends of the permanent magnets 20 (i.e., located at the stator core part 15 adjacent to the stator coiling part 12) is greater than a gap between outer ends of the permanent magnets 20 (i.e., located at the stator coiling part 12 facing the rotor 30).

Additionally, the permanent magnets 20 inserted into the stator coiling part 12 may be magnetized in the same direction as the direction of a magnetic field generated by the excited coil 14. Namely, in case a magnetic field is formed in a direction from the stator coiling part 12 to the stator core part 15 by the coil 14 wound clockwise on the external side of the stator coiling part 12, a pair of the permanent magnets 20 is installed so as to be magnetized in a direction from one portion of the stator core part 15 adjacent to the stator coiling part 12 to other portion of the stator core part 15 adjacent to the stator salient part 16.

Figure 12:
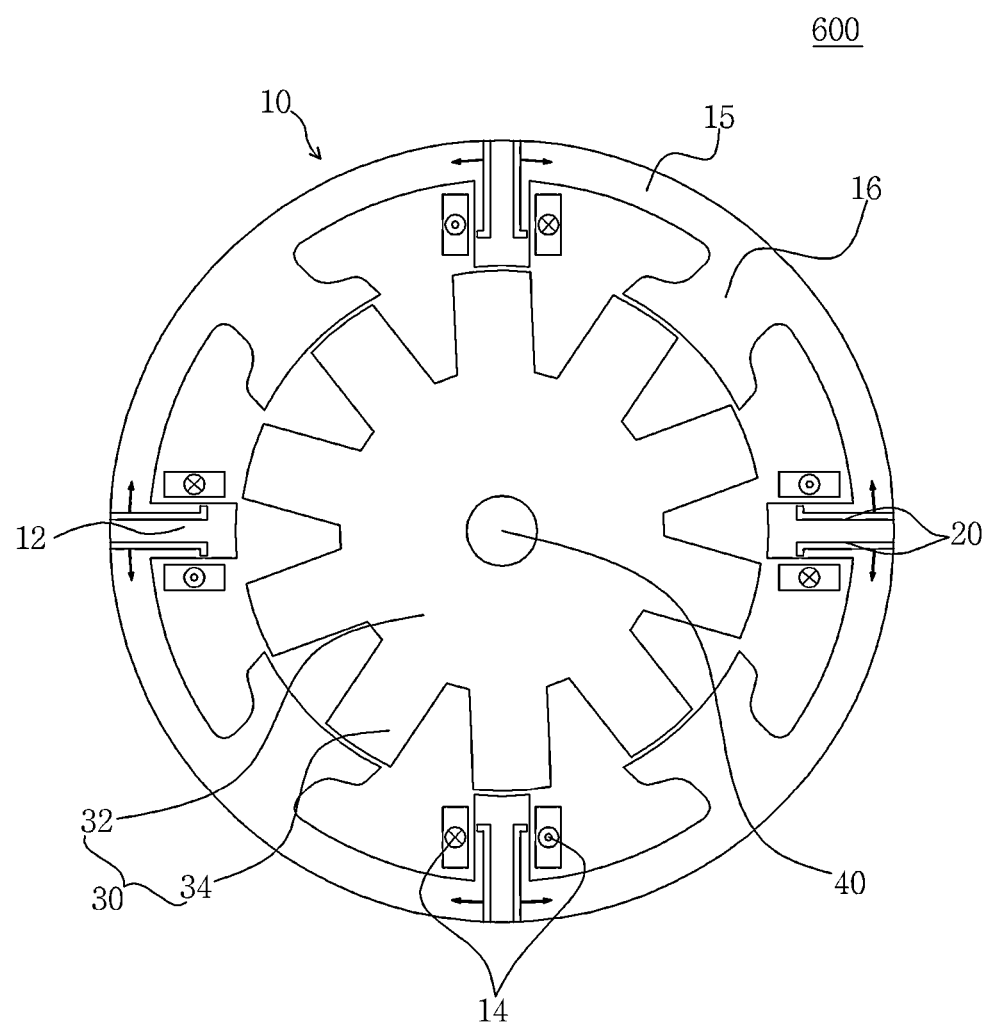
FIG. 12 is a schematic diagram illustrating a switched reluctance motor in accordance with the sixth embodiment of the present disclosure.

FIG. 12 is a schematic diagram illustrating a switched reluctance motor in accordance with the sixth embodiment of the present disclosure.

Referring to FIG. 12, in the sixth embodiment, the switched reluctance motor 600 includes the stator 10 and the rotor 30.

The stator 10 includes the stator core part 15, the stator coiling parts 12, the stator salient parts 16, and the permanent magnets 20.

The stator core part 15, the stator coiling parts 12, the stator salient parts 16, and the rotor 30 are the same elements as those discussed above in the first embodiment. Therefore, the following description will be focused on the permanent magnets 20.

A pair of the permanent magnets 20 may be inserted into the stator coiling parts 12 so as to be equally distant from a central line of the stator coiling part 12 and also to be bent at inner ends thereof. Namely, an outer portion of each permanent magnet 20 inserted in the stator core part 15 adjacent to the stator coiling part 12 runs parallel with the stator coiling part 12, and an inner portion of each permanent magnet 20 inserted in the stator coiling part 12 facing the rotor 30 is bent toward the external side of the stator coiling part 12.

Additionally, the permanent magnets 20 may be magnetized in the same direction as the direction of a magnetic field generated by the excited coil 14. Namely, in case a magnetic field is formed in a direction from the stator coiling part 12 to the stator core part 15 by the coil 14 wound clockwise on the external side of the stator coiling part 12, a pair of the permanent magnets 20 is installed so as to be magnetized in a direction from one portion of the stator core part 15 adjacent to the stator coiling part 12 to other portion of the stator core part 15 adjacent to the stator salient part 16.

While this disclosure has been particularly shown and described with reference to an exemplary embodiment thereof, it will be understood by those skilled in the art that various changes in form and details may be made therein without departing from the spirit and scope of this disclosure as defined by the appended claims.

What is claimed is:

1. A stator of a switched reluctance motor, the stator comprising:
    a stator core part;
    a plurality of stator coiling parts protruding inwardly from the stator core part and having coils wound on an external side thereof;
    a plurality of stator salient parts protruding inwardly from the stator core part and disposed between the stator coiling parts; and
    pairs of permanent magnets, each pair being inserted into each of the stator coiling parts and magnetized in the same direction as a direction of a magnetic field generated by the excitation of the coils.

2. The stator of claim 1, further comprising:
    another pairs of permanent magnets, each pair being inserted into each of the stator salient parts and magnetized in the same direction as the direction of the magnetic field generated by the excitation of the coils.

3. The stator of claim 1, wherein each pair of the permanent magnets inserted into each of the stator coiling parts is extended into the stator core part adjacent to the stator coiling parts and magnetized in the same direction as the direction of the magnetic field generated by the excitation of the coils.

4. The stator of claim 1, wherein each pair of the permanent magnets is inserted into the stator coiling part so as to be equally distant from a central line of the stator coiling part.

5. The stator of claim 1, wherein each pair of the permanent magnets is inserted into the stator coiling part so as to be aligned with a protruding direction of the stator coiling part.

6. A switched reluctance motor comprising:
    a stator including:
        a stator core part;
        a plurality of stator coiling parts protruding inwardly from the stator core part and having coils wound on an external side thereof;
        a plurality of stator salient parts protruding inwardly from the stator core part and disposed between the stator coiling parts; and
        pairs of permanent magnets, each pair being inserted into each of the stator coiling parts and magnetized in the same direction as a direction of a magnetic field generated by the excitation of the coils; and
    a rotor installed inside the stator and including:
        a rotor core part; and
        a plurality of rotor salient parts protruding outwardly from the rotor core part, each of the rotor salient parts facing one of the stator coiling parts and the stator salient parts.

7. The switched reluctance motor of claim 6, wherein the stator further includes another pairs of permanent magnets, each pair being inserted into each of the stator salient parts and magnetized in the same direction as the direction of the magnetic field generated by the excitation of the coils.

8. The switched reluctance motor of claim 6, wherein each pair of the permanent magnets inserted into each of the stator coiling parts is extended into the stator core part adjacent to the stator coiling parts and magnetized in the same direction as the direction of the magnetic field generated by the excitation of the coils.

* * * * *